(12) United States Patent
Prat et al.

(10) Patent No.: US 11,472,330 B2
(45) Date of Patent: Oct. 18, 2022

(54) METHOD FOR CORRECTING A LIGHT PATTERN AND AUTOMOTIVE LIGHTING DEVICE ASSEMBLY

(71) Applicant: VALEO VISION, Bobigny (FR)

(72) Inventors: Constantin Prat, Bobigny (FR); Ali Kanj, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 17/415,063

(22) PCT Filed: Dec. 16, 2019

(86) PCT No.: PCT/EP2019/085268
§ 371 (c)(1),
(2) Date: Jun. 17, 2021

(87) PCT Pub. No.: WO2020/126990
PCT Pub. Date: Jun. 25, 2020

(65) Prior Publication Data
US 2022/0063481 A1      Mar. 3, 2022

(30) Foreign Application Priority Data
Dec. 19, 2018 (EP) .................................. 18214120

(51) Int. Cl.
*B60Q 1/08* (2006.01)
*F21S 41/153* (2018.01)
(Continued)

(52) U.S. Cl.
CPC ............. *B60Q 1/08* (2013.01); *B60Q 1/1415* (2013.01); *F21S 41/153* (2018.01);
(Continued)

(58) Field of Classification Search
CPC ........ B60Q 1/08; B60Q 1/085; B60Q 1/1415; B60Q 1/0011; B60Q 2300/054; F21S 41/153
See application file for complete search history.

(56) References Cited

U.S. PATENT DOCUMENTS 8,436,394 B2 * 5/2013 Brick ................... H01L 33/387
257/E33.066
9,550,448 B2 * 1/2017 Tanaka ................. B60Q 1/1423
(Continued)

FOREIGN PATENT DOCUMENTS

DE   10 2008 054 218 A1   5/2010
DE   20 2011 103 805 U1   1/2012
(Continued)

OTHER PUBLICATIONS

International Search Report dated Mar. 23, 2020 in PCT/EP2019/085268 filed Dec. 16, 2019.

*Primary Examiner* — Arman B Fallahkhair
(74) *Attorney, Agent, or Firm* — Oblon, McClelland, Maier & Neustadt, L.L.P.

(57) ABSTRACT

A method for correcting a light pattern provided by a first lighting device and a second lighting device. The first lighting device projects a first light pattern and the second lighting device projects a second light pattern. There is an overlapping zone between the first light pattern and the second light pattern. The method includes the steps of, for each lighting device, dividing the light sources in groups, each group being associated to a projection distance, calculating an overlapping region as a function of the projection distance, calculating a number of affected light sources for each group as a function of a representative dimension of the overlapping region and attenuate the intensity of the light emitted by the affected light sources in each group of each lighting device, following a monotonic attenuation pattern from 100% attenuation in the first affected light source to 0% in the last affected light source. The invention also provides an automotive lighting device assembly with control means to perform the steps of this method.

20 Claims, 5 Drawing Sheets

(51) Int. Cl.
    *B60Q 1/14*         (2006.01)
    *F21Y 115/10*     (2016.01)
    *B60Q 1/00*         (2006.01)

(52) U.S. Cl.
    CPC ...... *B60Q 1/0011* (2013.01); *B60Q 2300/054* (2013.01); *F21Y 2115/10* (2016.08)

(56) References Cited

U.S. PATENT DOCUMENTS

| | | | |
|---|---|---|---|
| 10,378,718 B2* | 8/2019 | Kieslinger | F21S 41/43 |
| 11,092,303 B2* | 8/2021 | Park | F21S 41/153 |
| 2004/0218401 A1 | 11/2004 | Okubo et al. | |
| 2011/0215369 A1 | 9/2011 | Brick et al. | |
| 2011/0235349 A1* | 9/2011 | Nakaya | F21S 41/663 |
| | | | 362/543 |
| 2016/0167566 A1 | 6/2016 | Tanaka et al. | |
| 2016/0215946 A1 | 7/2016 | Kieslinger | |
| 2019/0315266 A1 | 10/2019 | Kubitza et al. | |

FOREIGN PATENT DOCUMENTS

| | | |
|---|---|---|
| DE | 10 2012 102 446 A1 | 9/2013 |
| DE | 10 2014 111 083 A1 | 2/2016 |
| DE | 10 2016 122 492 A1 | 5/2018 |
| DE | 10 2016 122 499 A1 | 5/2018 |
| EP | 1 433 655 A2 | 6/2004 |
| EP | 3 020 602 A1 | 5/2016 |
| EP | 3 182 801 A1 | 6/2017 |
| WO | WO 2015/031924 A1 | 3/2015 |

* cited by examiner

METHOD FOR CORRECTING A LIGHT PATTERN AND AUTOMOTIVE LIGHTING DEVICE ASSEMBLY

TECHNICAL FIELD

This invention is related to the field of automotive lighting devices, and more particularly, to the way light patterns are managed when the light pattern projected by two lighting devices generate an overlapping section.

STATE OF THE ART

Digital lighting devices are being increasingly adopted by car makers for middle and high market products.

These products can be distinguished by a higher resolution with respect to the old lighting technologies. But these lighting elements may lead to some technical issues, which are more visible with high definition projections and requires a controlled solution, such as "optical butting" problem.

When different beams coming from different light modules intersect on the road, the overlapped area is differently exposed than the rest of the zones, which do not suffer this overlapping. This situation causes a zone with saturated illumination and the corresponding lack of homogeneity between the different beams. This overlapping zone usually has a triangular shape with respect to the distance of projection. This effect is commonly known as "optical butting effect".

Further, the pitch angle of each lighting device,

Solutions are often focused on avoid glaring on pedestrians or other vehicles, but no solution is known to face this problem.

SUMMARY OF THE INVENTION

The invention provides an alternative solution for this optical butting effect by a method for correcting a light pattern according to claim 1 and an automotive lighting device according to claim 10. Preferred embodiments of the invention are defined in dependent claims.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

In a first inventive aspect, the invention provides a method for correcting a light pattern provided by a first lighting device and a second lighting device, wherein
the first lighting device comprises a plurality of light sources and projects a first light pattern;
the second lighting device comprises a plurality of light sources and projects a second light pattern; and
there is an overlapping zone between the first light pattern and the second light pattern,
wherein the method comprises the steps of
for each lighting device, dividing the light sources in groups, each group being associated to a projection distance,
calculating an overlapping region as a function of the projection distance;
calculating a number of affected light sources for each group as a function of a representative dimension of the overlapping region, wherein, for each lighting device, the first affected light source is the affected light source which is closest to the other lighting device and the last affected light source is the affected light source which is farthest to the other lighting device;
attenuate the intensity of the light emitted by the affected light sources in each group of each lighting device, following a monotonic attenuation pattern from 100% attenuation in the first affected light source to 0% in the last affected light source.

The position of the affected light sources is calculated in several steps. Firstly, an overlapping zone is estimated. The contribution of each group of light sources is classified depending on the projection distance that this group of light sources performs. For example, in a lighting device, some light sources aim to project light in 10-20 m from the lighting device, other group aims to project light in 20-30 m and other group on 30-50 m. Secondly, the region of overlapping is divided accordingly: a first zone from 10 to 20 m from the lighting device, another zone from 20 to 30 m from the lighting device and a final zone from 30 to 50 m from the lighting device. For each zone (i.e., for each group of light sources), the size of the overlapping region is used to calculate how many light sources are associated to this overlapping region at this projection distance. Finally, the intensity of these affected light sources is attenuated in every group of both lighting devices, but following an attenuation pattern which varies from 0% to 100%, in such a way that there is a progression in the attenuation. The attenuation of the luminous intensity of the affected light sources aims to correct or even solve the problem of overlapping, and the monotonic pattern aims to compensate the effect of the variation in the pitch angle of the lighting devices over the combined light pattern.

In some particular embodiments of this method, the step of attenuation is symmetrical in both lighting devices, in such a way that the attenuation in the first affected light source of one lighting device is the same as the attenuation in the first affected light source of the other lighting device, and the attenuation pattern is the same from the first affected light source to the last affected light source in both lighting devices.

In each lighting device, the attenuation follows the same pattern. Since the lighting devices are arranged symmetrically from the middle plane of the vehicle, the first affected light source of one of the lighting devices is symmetrically located with the first affected light source of the other lighting device. Since the contribution to the overlapping zone is symmetrical in both lighting devices, a single calculation may be made, and then the attenuation pattern may be applied symmetrically to the affected light sources of both projectors.

In some particular embodiments of this method, the attenuation pattern of the affected light sources within each lighting device is anti-symmetrical with respect to a central affected light source, which is the affected light source which is at the same distance from the first affected light source and from the last affected light source, wherein the anti-symmetrical pattern means that a first light source which is in a symmetrical position of a second light source has an attenuation which is 100%−a, wherein a is the attenuation of the second light source.

Since the lighting devices have a symmetrical attenuation pattern, a way of obtaining a 100% of luminous intensity when summing the beams of both lighting devices is setting an anti-symmetrical attenuation pattern within each lighting device. For each lighting device, the attenuation pattern in the light sources of this lighting device follows an anti-symmetrical pattern with respect to a central affected light source, which is the affected light source which is at the same distance from the first affected light source and from the last affected light source. The anti-symmetrical attenuation pattern of one lighting device aims that the combination with the anti-symmetrical attenuation pattern of the other lighting device makes a total 100% luminous intensity.

In some particular embodiments of this method, the attenuation pattern is linear.

Linearity is an easy example of this anti-symmetry; the attenuation goes linearly from 100% in the first affected light source to 0% in the last affected light source.

In some particular embodiments of this method,
the step of calculating a region of overlapping comprises calculating an angle of overlapping in each lighting device as a function of the projection distance; and
the step of calculating a number of affected light sources comprises calculating a number of affected light sources for each group as a function of the angle of overlapping.

Since the lighting devices usually projects a triangular beam, which causes a triangular overlapping zone, the angle of overlapping is a useful magnitude. In each light group, each light source corresponds to an angle range, so that when the overlapping angle is calculated, the number of affected light sources in each group is easily obtained.

In some particular embodiments of this method, each group of light sources comprises more than one column of light sources, in such a way that each column is associated to an angle range, so that for a given angle, a number of columns are associated to this angle in each group.

In some particular embodiments of this method,
each lighting device comprises a matrix arrangement of solid-state light sources, with columns and rows;
the step of dividing the solid-state light sources in groups comprising dividing the rows into groups of rows, so that each group of rows correspond to a range of projection distance;
the step of attenuation comprises attenuate all the affected light sources of each group with the same attenuation percentage.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the life span of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

A matrix arrangement is a typical example for this method. The rows may be grouped in projecting distance ranges and each column of each group represent an angle interval. This angle value depends on the resolution of the matrix arrangement, which is typically comprised between 0.01° per column and 0.5° per column. As a consequence, when the overlapping angle is calculated, the number of affected columns is very easy to obtain. E. g., in a matrix with a resolution of 0.1° per column, if the overlapping angle for a particular group is 2.5°, 25 columns of this group will be affected, and then dimmed.

In some particular embodiments, the method further comprises the step of performing a linear interpolation in the calculation of the affected light sources for each row.

If a group comprises several rows, instead of actuating on all the light sources of the columns, a linear interpolation between groups may be made: if one group has 10 rows and, after the calculation, has 10 columns of affected light sources, and the adjacent one has 20 columns affected, instead of having 10 rows of 10 light sources and then 10 rows of 20 light sources, a linear interpolation may be adopted between the 20 rows of both groups.

In some particular embodiments, the method further comprises the step of capping the number of affected light sources for the groups of rows which has a projection distance which is infinite.

Due to the pitch angle of the lighting devices, there are some rows which project to the infinite (pitch angle=0°) or even higher (pitch angle>0°). For those rows, there is no need of following a linear progression, since all the rows above the row which projects in 0° will have the same number of affected light sources.

In a second inventive aspect, the invention provides an automotive lighting device assembly comprising a first lighting device and a second lighting device, each lighting device comprising
a matrix arrangement of solid-state light sources, intended to provide a light pattern;
control means for accomplishing the steps of the method according to any of the preceding claims.

This lighting device assembly solves the problem of the overlapping region between the two lighting devices.

In some particular embodiments, the matrix arrangement comprises at least 2000 solid-state light sources.

BRIEF LIST OF DRAWINGS AND REFERENCE NUMBERS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures:

FIG. 6b shows the sum of luminous intensities in a pattern like the one shown in FIG. 6a.

Elements of the example embodiments are consistently denoted by the same reference numerals throughout the drawings and detailed description where appropriate:
1 First lighting device
11 First light pattern of the first lighting device
2 Second lighting device
12 Second light pattern of the second lighting device
3 LED
31 First group of LEDs
32 Second group of LEDs
33 Third group of LEDs
34 Fourth group of LEDs
35 Fifth group of LEDs
4 Overlapping zone
41 First affected column
42 Last affected column
43 Central affected column
51 Upper zone of light pattern
100 Automotive vehicle

DETAILED DESCRIPTION OF THE INVENTION

The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

Figure 1:
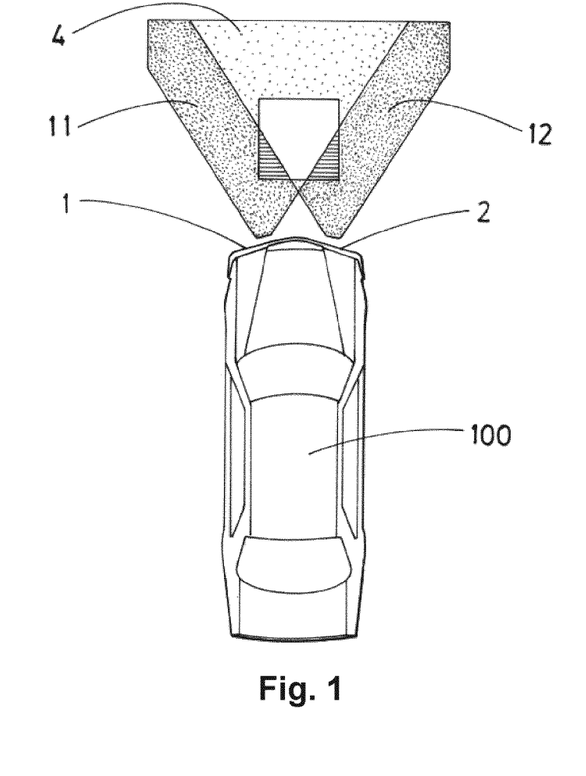
FIG. 1 shows a general perspective view of an automotive lighting device assembly according to the invention.

FIG. 1 shows a general perspective view of an automotive lighting device assembly according to the invention.

This lighting device assembly is installed in an automotive vehicle 100 and comprises a first lighting device 1 and a second lighting device 2.

Each lighting device 1, 2 comprises
a matrix arrangement of LEDs, intended to provide a light pattern;
control means for controlling the intensity of each LED, to perform lighting functions and, particularly, to control the intensity in the overlapping zone between the two lighting devices.

As may be seen in this figure, the first lighting device 1 projects a first light pattern 11 and the second lighting device 2 projects a second light pattern 12. These two light patterns 11, 12 create an overlapping zone 4, where the luminous intensity of both patterns is summed. Hence, if no method was performed to solve this problem, the intensity in this overlapping zone would be 200%, compared to the 100% in the rest of the light patterns.

This matrix configuration is a high-resolution module, having a resolution greater than 10000 pixels. However, no restriction is attached to the technology used for producing the projection modules.

A first example of this matrix configuration comprises a monolithic source. This monolithic source comprises a matrix of monolithic electroluminescent elements arranged in several columns by several rows. In a monolithic matrix, the electroluminescent elements can be grown from a common substrate and are electrically connected to be selectively activatable either individually or by a subset of electroluminescent elements. The substrate may be predominantly made of a semiconductor material. The substrate may comprise one or more other materials, for example non-semiconductors (metals and insulators). Thus, each electroluminescent element/group can form a light pixel and can therefore emit light when its/their material is supplied with electricity. The configuration of such a monolithic matrix allows the arrangement of selectively activatable pixels very close to each other, compared to conventional light-emitting diodes intended to be soldered to printed circuit boards. The monolithic matrix may comprise electroluminescent elements whose main dimension of height, measured perpendicularly to the common substrate, is substantially equal to one micrometre.

The monolithic matrix is coupled to the control centre so as to control the generation and/or the projection of a pixilated light beam by the matrix arrangement. The control centre is thus able to individually control the light emission of each pixel of the matrix arrangement.

Alternatively to what has been presented above, the matrix arrangement may comprise a main light source coupled to a matrix of mirrors. Thus, the pixelated light source is formed by the assembly of at least one main light source formed of at least one light emitting diode emitting light and an array of optoelectronic elements, for example a matrix of micro-mirrors, also known by the acronym DMD, for "Digital Micro-mirror Device", which directs the light rays from the main light source by reflection to a projection optical element. Where appropriate, an auxiliary optical element can collect the rays of at least one light source to focus and direct them to the surface of the micro-mirror array.

Each micro-mirror can pivot between two fixed positions, a first position in which the light rays are reflected towards the projection optical element, and a second position in which the light rays are reflected in a different direction from the projection optical element. The two fixed positions are oriented in the same manner for all the micro-mirrors and form, with respect to a reference plane supporting the matrix of micro-mirrors, a characteristic angle of the matrix of micro-mirrors defined in its specifications. Such an angle is generally less than 20° and may be usually about 12°. Thus, each micro-mirror reflecting a part of the light beams which are incident on the matrix of micro-mirrors forms an elementary emitter of the pixelated light source. The actuation and control of the change of position of the mirrors for selectively activating this elementary emitter to emit or not an elementary light beam is controlled by the control centre.

In different embodiments, the matrix arrangement may comprise a scanning laser system wherein a laser light source emits a laser beam towards a scanning element which is configured to explore the surface of a wavelength converter with the laser beam. An image of this surface is captured by the projection optical element.

The exploration of the scanning element may be performed at a speed sufficiently high so that the human eye does not perceive any displacement in the projected image.

The synchronized control of the ignition of the laser source and the scanning movement of the beam makes it possible to generate a matrix of elementary emitters that can be activated selectively at the surface of the wavelength converter element. The scanning means may be a mobile micro-mirror for scanning the surface of the wavelength converter element by reflection of the laser beam. The micro-mirrors mentioned as scanning means are for example MEMS type, for "Micro-Electro-Mechanical Systems". However, the invention is not limited to such a scanning means and can use other kinds of scanning means, such as a series of mirrors arranged on a rotating element, the rotation of the element causing a scanning of the transmission surface by the laser beam.

In another variant, the light source may be complex and include both at least one segment of light elements, such as light emitting diodes, and a surface portion of a monolithic light source.

Figure 2:
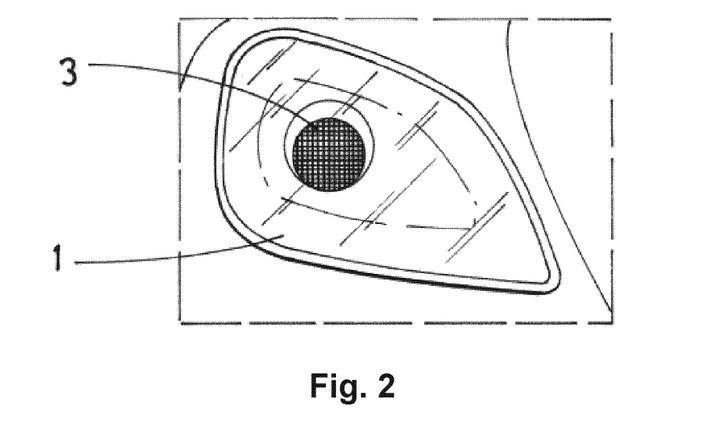
FIG. 2 shows a closer view of one of the lighting devices of a particular embodiment of a lighting device assembly according to the invention.

FIG. 2 shows a closer view of one of the lighting devices of a particular embodiment of a lighting device assembly according to the invention.

As mentioned above, each lighting device (in this figure only first lighting device 1 is represented) comprises a matrix arrangement of LEDs 3, with columns and rows. Each column projects a light beam in a determined angle, and each row projects a light beam in a predetermined projecting distance. As a consequence, each row may be associated to a projecting distance and each column may be associated to an angle range. The difference between rows and between columns depends on the resolution of the matrix arrangement.

The pitch angle of the lighting device will cause that, from a determined row and above, the projecting distance is infinite, because the beam will be projected parallel to the road or even with a positive angle.

Figure 3:
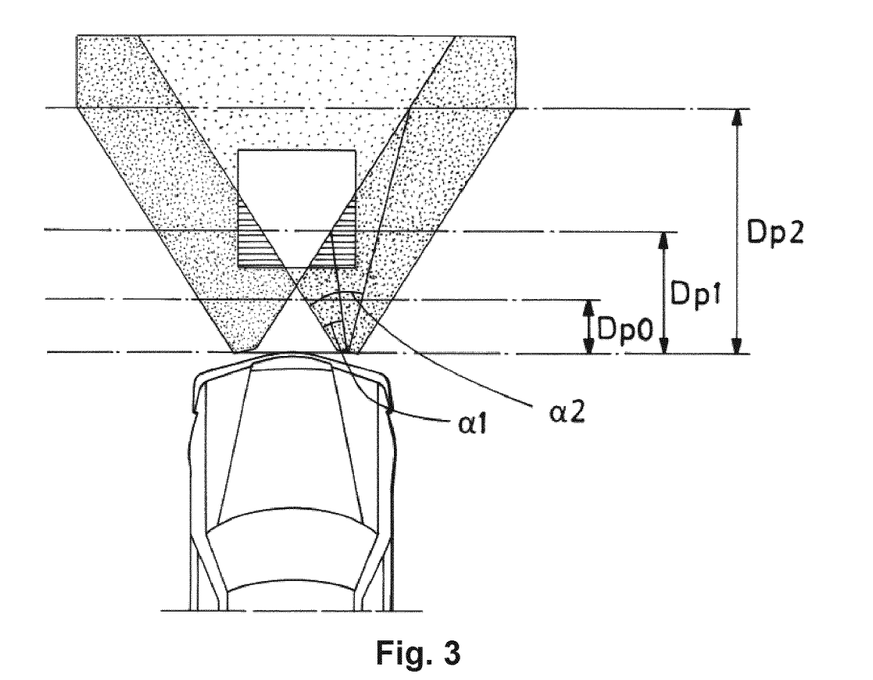
FIG. 3 shows a map of the overlapping zone and the relation with the projecting distance in an automotive lighting device assembly according to the invention.

FIG. 3 shows a map of the overlapping zone and the relation with the projecting distance. For each projecting distance, which are labelled as Dp0, Dp1, Dp2, etc, the overlapping zone varies, and the angle of the light pattern which is affected by the overlapping zone varies as well.

For example, for Dp0, there is no overlapping zone, so the rows of LEDs which project light at this distance or at a lower distance will not be affected by the correction defined by the method of the invention. For Dp1, there is an overlapping zone with an overlapping angle α1, and for Dp2, there is an overlapping zone with an overlapping angle α2. Of course, only three projecting distances have been analysed in this figure, but the method of the invention may analyse any number of different projecting distances, depending on the accuracy that is required.

Figure 4:
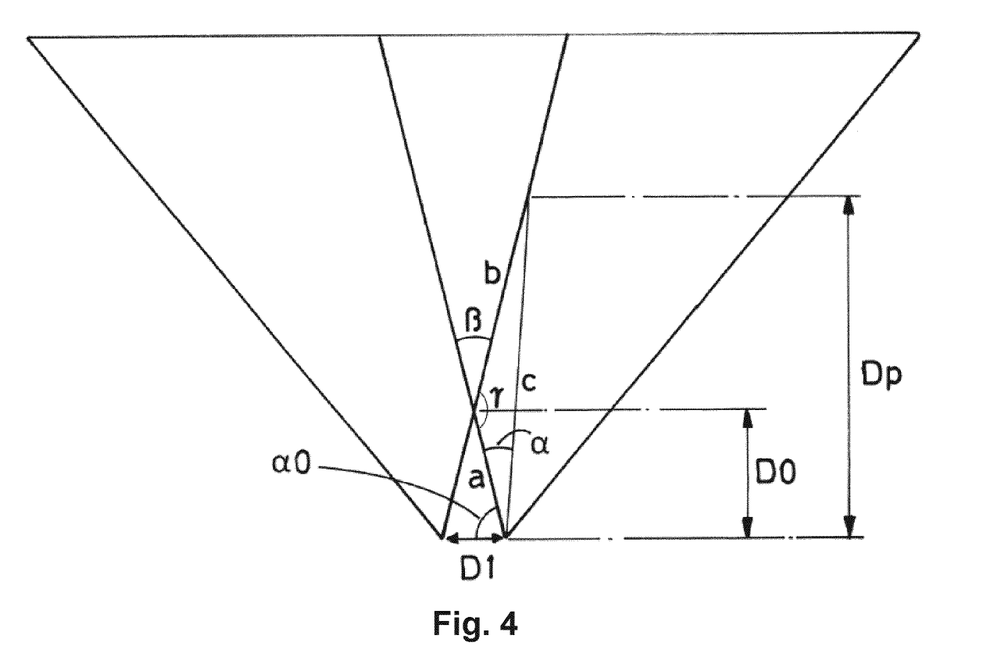
FIG. 4 shows how to obtain geometric parameters for a method according to the invention.

This angle α may be obtained as a function of some geometric parameters, as will be shown in FIG. 4. Once this angle α is calculated as a function of the projecting distance Dp, the method of the invention comprises dimming the luminous intensity of some affected light sources in each row to mitigate or even solve the problem of the overlapping zone. As each row defines a projection distance and, for each row, each column defines an angle range, it is straightforward to assign the affected light sources in each row. FIGS. 5 to 8 will develop more detailed examples of choosing these affected light sources.

FIG. 4 shows how to obtain the angle α as a function of the projecting distance Dp and other geometric parameters.

As may be seen in this figure, the two lighting devices are separated at a distance D1, and both of them project a symmetric light pattern which has an inner angle $\alpha_0$. For a projecting distance Dp1, there is an overlapping zone 4 which defines a side b in a triangle a-b-c, where a is the distance between one of the lighting devices and the point where the overlapping zone 4 starts and c is the distance between the same lighting device and the most outer point where the overlapping zone 4 finishes.

Using conventional geometric relations, it may be shown that the three sides of the triangle may be expressed as a function of the initial data and the projecting distance Dp.

$$a = \frac{D_1}{2\cos a_0}$$

$$b = \frac{Dp - D_0}{\cos\left(\frac{\beta}{2}\right)}$$

$$c = \sqrt{a^2 + b^2 - 2ab\cos\gamma}$$

And the angle α, using the Al-Kashi theorem, may be expressed as a function of these three sides:

$$\alpha = \cos^{-1}\left(\frac{a^2 + c^2 - b^2}{2ac}\right)$$

Figure 5:
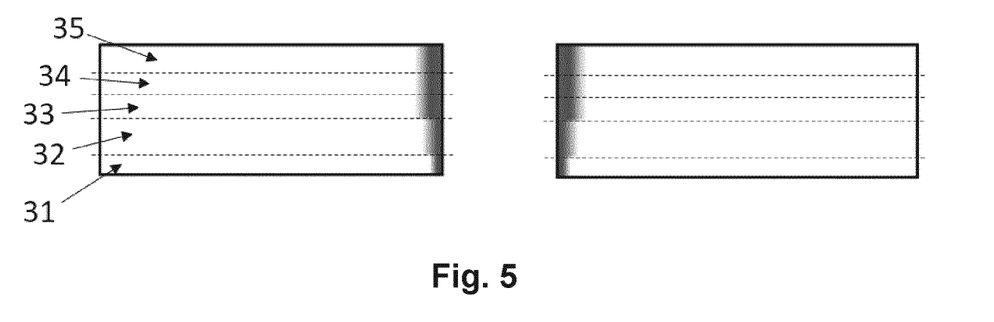
FIG. 5 shows some of the attenuation steps of a method according to the invention.

Once this angle is calculated as a function of the projecting distance, FIGS. 5, 6 and 7 will show particular examples of choosing the affected light sources in each row.

FIG. 5 shows some of the attenuation steps of a method according to the invention, in particular the determination of the number of affected columns in each group of rows.

In this figure, the rows have been grouped into row groups, so that each row group is associated to a range of projecting distance. For the sake of convenience, in this example, five groups are defined: a first group of rows 31 from 0 to 20 m of projecting distance, a second group of rows 32 from 20 to 40 m of projecting distance, a third group or rows 33 from 40 m to 60 m of projecting distance, a fourth group of rows 34 from 60 m to infinite and a fifth group of rows 35 which projects in a positive angle with respect of the plane of the road.

In this example, when calculating a as a function of the projecting distance, 1° corresponds to 20 m of projecting distance, 2° corresponds to 40 m of projecting distance and 3° corresponds to 60 m of projecting distance. The resolution of the matrix is 0.2° per column.

Hence, in the first group, the range includes the projecting distance for 1°, so 5 columns (each column corresponds to 0.2°, so to reach 1°, 5 columns are necessary) will be affected. In the second group, which includes the projection distance for 2°, 10 columns will be affected, and in the third group, which includes the projection distance for 3°, 15 columns will be affected. In the fourth and fifth groups, 15 columns will be affected as well, since 4° is a value which is not reached with this configuration.

Figure 6A:
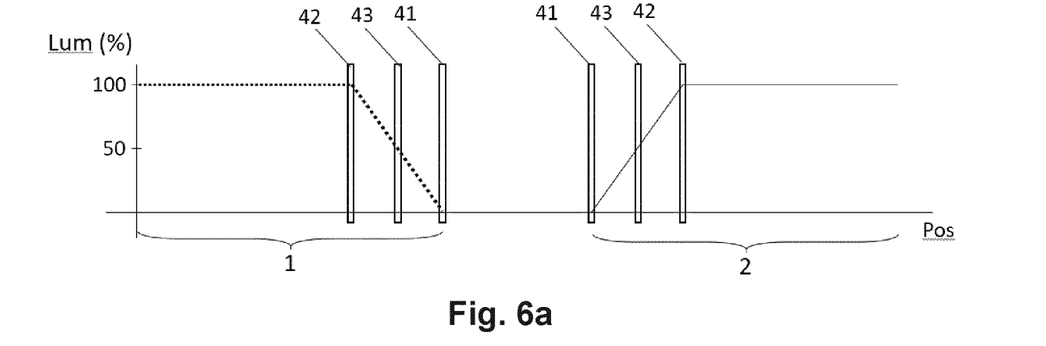
FIG. 6a shows the attenuation pattern in a group of rows.

Once the number of affected columns is chosen in each group of rows, light intensity is attenuated according to the pattern which is shown in FIG. 6a.

This FIG. 6a shows the attenuation pattern in a group of rows. In each group of rows, all the light sources of the same column have the same luminous intensity, so the parameters of the attenuation is the luminous intensity against the position of the column.

The ordinate shows the luminous intensity and the abscissa shows the position of the light column. In each group of rows, the first affected column 41 is the affected column which is closest to the other lighting device and the last affected column 42 is the affected column which is farthest to the other lighting device.

In all these figures, the luminous intensity of the first lighting device is shown in a dotted line, the luminous intensity of the second lighting device is shown in a continuous line and the sum is shown in a dashed line.

The attenuation pattern is linear from 100% attenuation (0% luminous intensity) in the first affected column 41 to 0% attenuation (100% luminous intensity) in the last affected column 42. Further, attenuation is symmetrical in both lighting devices 1, 2, in such a way that the attenuation in the first affected column 41 of one group of rows in the first lighting device 1 is the same as the attenuation in the first affected column of the same group of rows of the second lighting device 2, and the linear attenuation pattern is the same from the first affected column to the last affected column in the same group of rows of both lighting devices. The result is a symmetric attenuation pattern, as shown in FIG. 5.

Since the linear pattern is anti-symmetrical with respect to a central affected column 43, which is the affected column which is at the same distance from the first affected column and from the last affected column, the sum of the luminous intensities of both lighting devices in the overlapping zone is 100%.

Figure 6B:
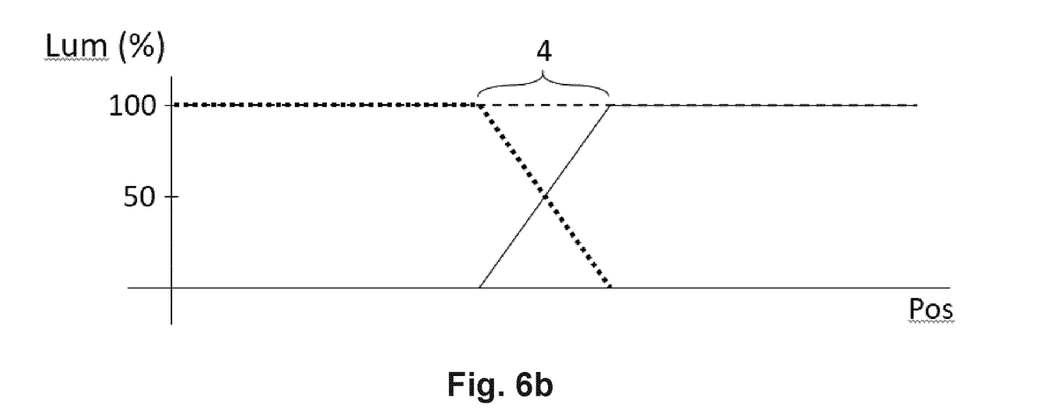

FIG. 6b shows the combined light pattern and the sum of the lighting intensities in the overlapping zone. The dotted line shows the sum of both intensities, and is 100% during all the light range, especially in the overlapping zone 4.

Further, due to this linear attenuation pattern, the sum of these luminous intensities is less sensitive to a variation in the pitch angle of the lighting devices. FIGS. 7a to 7d show the effect of a variation in the pitch angle in the sum of luminous intensities in the overlapping zone.

Figure 7A:
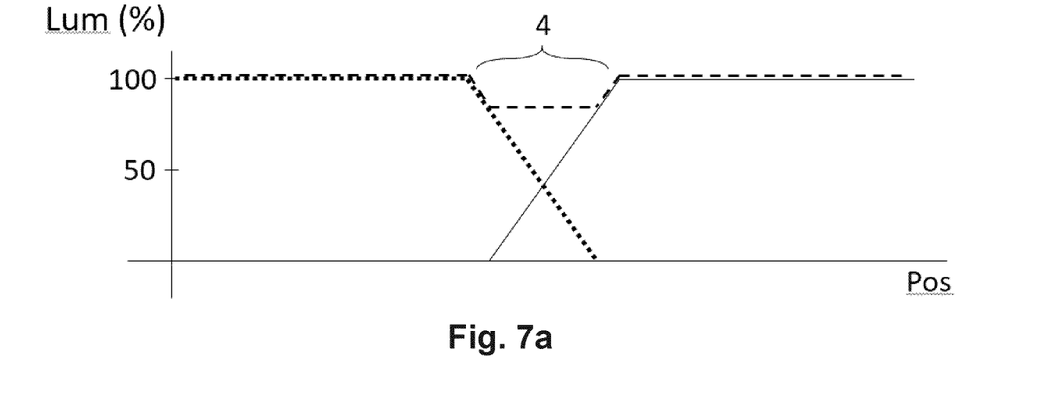
FIGS. 7a to 7d show the luminous intensities in a pattern like the one shown above when the pitch angle varies.
Figure 7B:
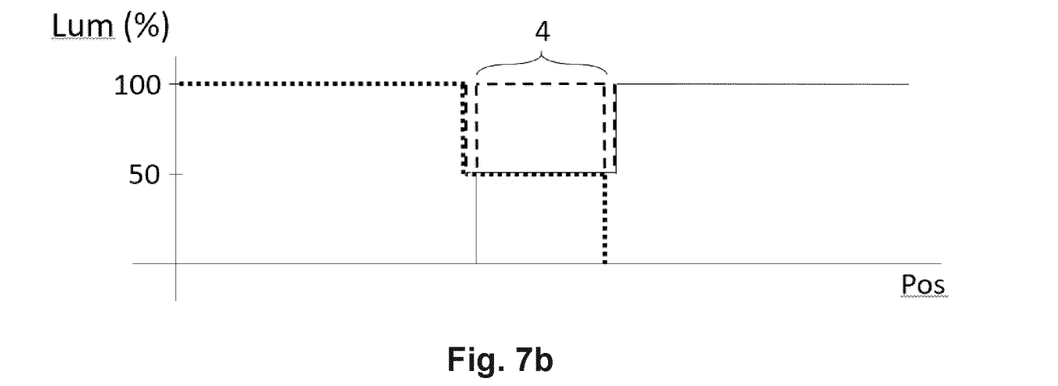

FIG. 7a shows the variation in the attenuation pattern when the pitch angle is +0.5°. In this case, the effective lighting pattern varies, since the projecting distance of each row changes. However, with an attenuation pattern as the one shown in FIG. 6a, this variation due to the pitch angle is not dramatical. FIG. 7b shows the effect of this variation in the pitch angle if the attenuation pattern was a constant. When the angle varies, there are regions where the luminous intensity falls abruptly from 100% to 50%. In the case of FIG. 7a, the variation in the pitch angle just causes a light decrease in the luminous intensity, but this decrease is not abrupt and merely means a 10% decrease in the luminous intensity of the overlapping zone.

Figure 7C:
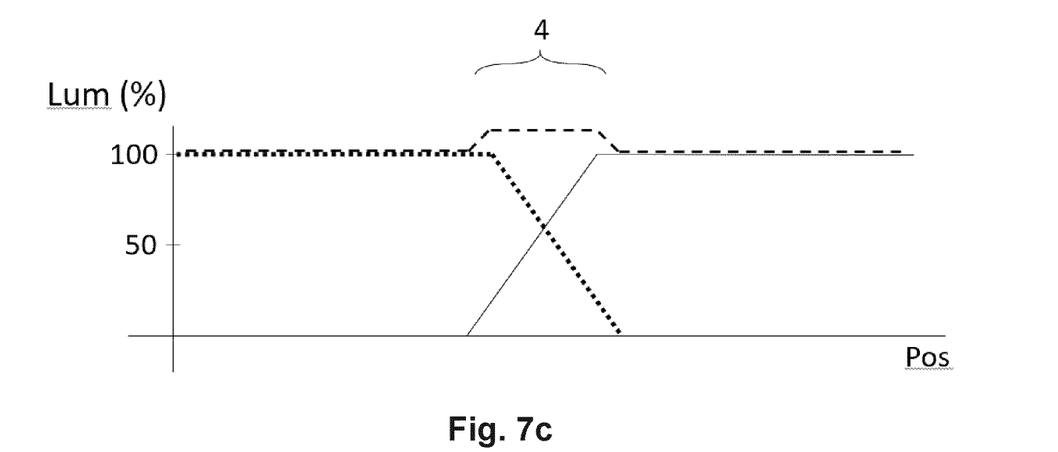
Figure 7D:
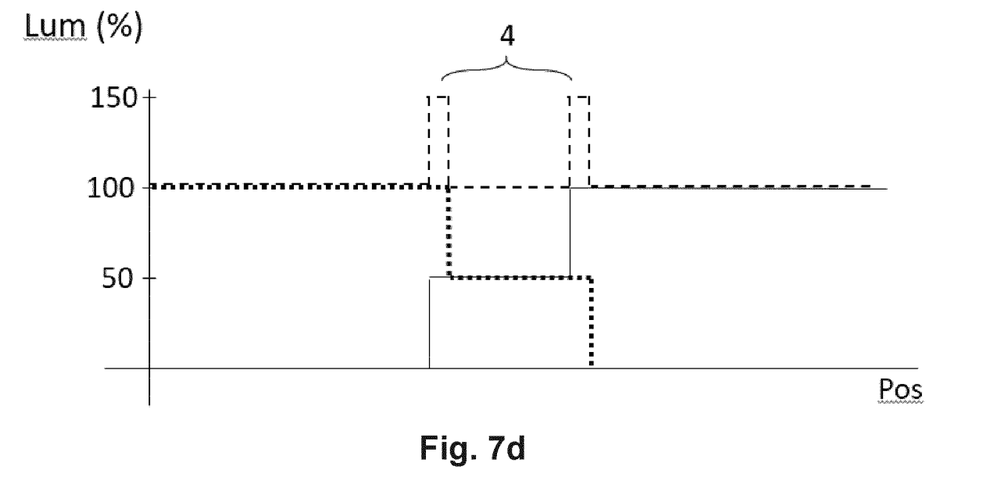

FIGS. 7c and 7d shows the same example in the event of a negative variation in the pitch angle.

Figure 8A:
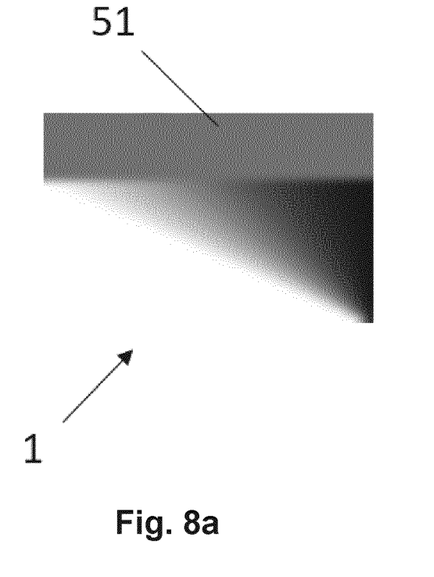
FIGS. 8*a* and 8*b* show the effect of this correction on a left light pattern and on a right light pattern of an automotive lighting device assembly according to the invention.
Figure 8B:
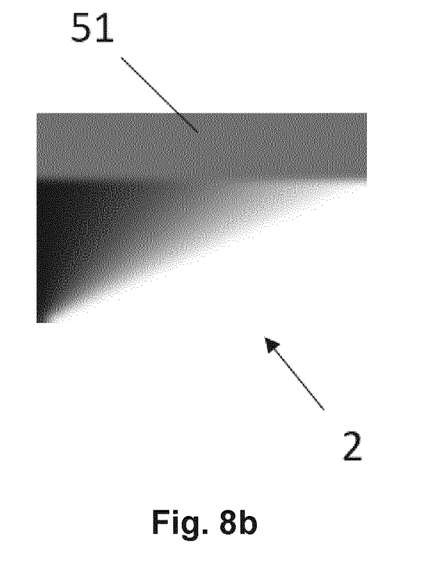

FIGS. 8a and 8b show the effect of this correction on a left light pattern and on a right light pattern of an automotive lighting device assembly according to the invention.

In these figures, a linear interpolation is carried out row by row, starting from the results of the method illustrated in FIG. 5.

As may be seen in these figures, there is an upper zone 51 which reflects an attenuation for those rows which project light over the horizon, in a positive angle with respect to the road surface.

Further, each row has a different number of affected light sources, and in each row, a linear attenuation pattern from 100% attenuation (0% luminous intensity) in the first affected light source of each row to 0% attenuation (100% luminous intensity) in the last affected light source of each row has been performed. As may be seen, attenuation is symmetrical in both lighting devices 1, 2. The result is a symmetric attenuation pattern.

The invention claimed is:

1. Method for correcting a light pattern provided by a first lighting device and a second lighting device, wherein
the first lighting device comprises a plurality of light sources and projects a first light pattern;
the second lighting device comprises a plurality of light sources and projects a second light pattern; and
there is an overlapping zone between the first light pattern and the second light pattern,
wherein the method comprises the steps of
for each lighting device dividing the light sources in groups, each group being associated to a projection distance,
calculating an overlapping region as a function of the projection distance;
calculating a number of affected light sources for each group as a function of a representative dimension of the overlapping region, wherein, for each lighting device, the first affected light source is the affected light source which is closest to the other lighting device and the last affected light source is the affected light source which is farthest to the other lighting device;
attenuate the intensity of the light emitted by the affected light sources in each group of each lighting device, following a monotonic attenuation pattern from 100% attenuation in the first affected light source to 0% in the last affected light source.

2. Method according to claim 1, wherein the step of attenuation is symmetrical in both lighting devices, in such a way that the attenuation in the first affected light source of one lighting device is the same as the attenuation in the first affected light source of the other lighting device, and the attenuation pattern is the same from the first affected light source to the last affected light source in both lighting devices.

3. Method according to claim 2, wherein the attenuation pattern of the affected light sources within each lighting device is anti-symmetrical with respect to a central affected light source, which is the affected light source which is at the same distance from the first affected light source and from the last affected light source, wherein the anti-symmetrical pattern means that a first light source which is in a symmetrical position of a second light source has an attenuation which is 100%—a, wherein a is the attenuation of the second light source.

4. Method according to claim 3, wherein the attenuation pattern is linear.

5. Method according to claim 4, wherein
the step of calculating a region of overlapping comprises calculating an angle of overlapping in each lighting device as a function of the projection distance; and
the step of calculating a number of affected light sources comprises calculating a number of affected light sources for each group as a function of the angle of overlapping.

6. Automotive lighting device assembly comprising a first lighting device and a second lighting device, each lighting device comprising
a matrix arrangement of solid-state light sources, intended to provide a light pattern;
control means for accomplishing the steps of the method according to claim 4.

7. Method according to claim 2, wherein
the step of calculating a region of overlapping comprises calculating an angle of overlapping in each lighting device as a function of the projection distance; and
the step of calculating a number of affected light sources comprises calculating a number of affected light sources for each group as a function of the angle of overlapping.

8. Automotive lighting device assembly comprising a first lighting device and a second lighting device, each lighting device comprising a matrix arrangement of solid-state light sources, intended to provide a light pattern;

control means for accomplishing the steps of the method according to claim 2.

9. Method according to claim 3, wherein the step of calculating a region of overlapping comprises calculating an angle of overlapping in each lighting device as a function of the projection distance; and the step of calculating a number of affected light sources comprises calculating a number of affected light sources for each group as a function of the angle of overlapping.

10. Automotive lighting device assembly comprising a first lighting device and a second lighting device, each lighting device comprising a matrix arrangement of solid-state light sources, intended to provide a light pattern;

control means for accomplishing the steps of the method according to claim 3.

11. Method according to claim 1, wherein the step of calculating a region of overlapping comprises calculating an angle of overlapping in each lighting device as a function of the projection distance; and the step of calculating a number of affected light sources comprises calculating a number of affected light sources for each group as a function of the angle of overlapping.

12. Method according to claim 11, wherein each lighting device comprises a matrix arrangement of solid-state light sources, with columns and rows;

the step of dividing the solid-state light sources in groups comprising dividing the rows into groups of rows, so that each group of rows correspond to a range of projection distance;

the step of attenuation comprises attenuate all the affected light sources of each group with the same attenuation percentage.

13. Method according to claim 12, further comprising the step of performing a linear interpolation in the calculation of the affected light sources for each row.

14. Method according to claim 13, further comprising the step of capping the number of affected light sources for the groups of rows which has a projection distance which is infinite.

15. Method according to claim 11, wherein each group of light sources comprises more than one column of light sources, in such a way that each column is associated to an angle range, so that for a given angle, a number of columns are associated to this angle in each group.

16. Method according to claim 15, wherein each lighting device comprises a matrix arrangement of solid-state light sources, with columns and rows;

the step of dividing the solid-state light sources in groups comprising dividing the rows into groups of rows, so that each group of rows correspond to a range of projection distance;

the step of attenuation comprises attenuate all the affected light sources of each group with the same attenuation percentage.

17. Automotive lighting device assembly comprising a first lighting device and a second lighting device, each lighting device comprising a matrix arrangement of solid-state light sources, intended to provide a light pattern;

control means for accomplishing the steps of the method according to claim 15.

18. Automotive lighting device assembly comprising a first lighting device and a second lighting device, each lighting device comprising a matrix arrangement of solid-state light sources, intended to provide a light pattern;

control means for accomplishing the steps of the method according to claim 11.

19. Automotive lighting device assembly comprising a first lighting device and a second lighting device, each lighting device comprising a matrix arrangement of solid-state light sources (3), intended to provide a light pattern;

control means for accomplishing the steps of the method according to claim 1.

20. Automotive lighting device assembly according to claim 19, wherein the matrix arrangement comprises at least 2000 solid-state light sources.

\* \* \* \* \*